United States Patent [19]
Bornhorst et al.

[11] Patent Number: 5,825,548
[45] Date of Patent: Oct. 20, 1998

[54] CROSS-FADING COLOR FILTER AND SYSTEM

[75] Inventors: James M. Bornhorst, Desoto; Richard W. Hutton, Dallas, both of Tex.

[73] Assignee: Vari-Lite, Inc., Dallas, Tex.

[21] Appl. No.: 927,917

[22] Filed: Sep. 11, 1997

[51] Int. Cl.⁶ .................................. G02B 5/28; F21V 9/00
[52] U.S. Cl. .................... 359/578; 359/892; 359/589; 362/277; 362/293; 362/319
[58] Field of Search ...................... 359/578, 589, 359/889, 891, 892; 362/277, 293, 319

[56] References Cited

U.S. PATENT DOCUMENTS

| | | | |
|---|---|---|---|
| 3,416,864 | 12/1968 | Keahl et al. | 359/589 |
| 5,126,886 | 6/1992 | Richardson et al. | 359/889 |
| 5,426,576 | 6/1995 | Hewlett | 359/889 |
| 5,453,883 | 9/1995 | Chazallet | 359/889 |

*Primary Examiner*—Jon W. Henry
*Attorney, Agent, or Firm*—Morgan & Finnegan,LLP

[57] ABSTRACT

A color filter plate includes a continuously-variable dichroic filter coating constituting a variable band-pass or variable band-reject filter having a spatially-modulated variable-density pattern formed in the coating, and provides continuously-variable hue and saturation characteristics along separate gradient axes. A color filter assembly includes a variable band-pass and a variable band-reject filter mounted in a co-planar arrangement, providing a continuous range of color filtration for spectral and non-spectral colors. A color filter mechanism includes a color filter assembly having either a rectangular arrangement or a circular arrangement of co-planar, continuously-variable band-pass and band-reject filters mounted in a motorized carriage. One mechanism provides two-axis translation of the rectangular color filter assembly while another mechanism provides translation and rotation of the circular color filter assembly. A light projection system comprising a lamp with a reflector and a lens includes a color filter mechanism having co-planar, continuously-variable band-pass and band-reject filters supported by a motorized carriage mounted in a region where the beam diameter is small.

69 Claims, 5 Drawing Sheets

CROSS-FADING COLOR FILTER AND SYSTEM

BACKGROUND OF THE INVENTION

1. Field of the Invention

The present invention relates generally to stage lighting instruments having associated color-changing mechanisms and particularly to a light source including a planar, selected-wavelength modifier that is adjustable in the plane of the modifier.

2. Description of Related Art

Prior art stage lighting instruments can generally be classified as either spot lights or as flood (or wash) lights, the former projecting an image through a lens as a focused spot of light, the latter directing a non-focused beam of light towards a general area to be illuminated. Various techniques for imparting a particular color to the light beam have been devised, and may depend in part upon the optical system used in a particular spot light or wash light. The earliest known technique utilized a color filter medium, such as a glass container filled with colored water, a sheet of colored gelatin or a sheet of colored plastic, which was placed in front of the light source such that the light beam passed through the filter and was colored thereby. These early filters were required to be large enough to cover the beam, usually being placed across the exit aperture of a luminaire, which is generally the coolest and most easily accessible part still in the light path of the luminaire.

Several techniques have been disclosed for changing the color of a light beam through the use of dichroic filters placed in the beam. For example, reference is made to U.S. Pat. Nos. 4,392,187; 4,602,321; 4,800,474; 4,914,556; 4,984,143; 5,126,886; 4,811,182; 4,893,225; 4,897,770; 4,958,265; 4,894,760; 5,188,452; 4,418,996; 5,282,121; and 5,426,576.

There are, however, several reasons for improving the color changing technology for focused-beam spot luminaires. The region of the optical system in which the beam has a relatively small diameter is itself relatively small longitudinally, and there are several devices for which that region is the optimum location, including a projection gate for image pattern generators (gobos), a variable aperture mechanism (beam size iris, shutters), and color filter exchanging mechanisms (color wheels). Also, there is the desire to minimize losses through the optical system by reducing the number of surfaces through which the light beam is transmitted before exiting the luminaire. Therefore, a need exists to reduce the color filter mechanism to a single element providing the full range of spectral colors (each comprising a contiguous band of visible light wavelengths) and non-spectral colors (each comprising two or more non-contiguous bands of wavelengths) continuously adjustable in hue and saturation.

SUMMARY OF THE INVENTION

In accordance with one aspect of the present invention, a color filter plate includes a spatially-modulated, all-dielectric, multi-layer, thin-film, interference (dichroic) filter coating; the various layers thereof having a thickness that varies along a first gradient axis of the plate; the coating having a density that varies along a second gradient axis of the plate; the thickness and density preferably varies continuously along their respective gradient axes. The color filter formed thereby exhibits a continuously-variable hue characteristic along the first gradient axis and exhibits a continuously-variable saturation characteristic along the second gradient axis. The color filter plate is illuminated by white, visible light in a beam having a low cone half-angle and a small spot size such that the beam color is determined by the location of the spot on the filter coating. The position of the spot on the filter is controlled by moving the color filter plate along the first and/or second gradient axes thereof. The continuously-variable filter of the present invention may comprise a variable band pass (VBP) dichroic filter coating or a variable band reject (VBR) dichroic filter coating deposited on a transparent substrate.

According to another aspect of the present invention, a color filter mechanism, includes a first color filter plate having a continuously-variable band pass (CVBP) dichroic filter coating and a second color filter plate having a continuously-variable band reject (CVBR) dichroic filter, each of the filter coatings having continuously-variable hue characteristic along a first gradient axis of the plate and having continuously-variable saturation characteristic along a second gradient axis of the plate. The two color filter plates are mounted, abutting edge-to-edge in a single plane, in a carriage moveable in two axes of a plane. Alternatively, the color filter mechanism may include a color filter assembly comprising a CVBP filter and a CVBR filter formed on a single transparent substrate. The plane of movement is preferably normal to the axis of a light beam passing through the plane of the filter plates. The filter plates are preferably mounted so that the edges adjacent to the areas of maximum saturation touch.

According to another aspect of the present invention, a color filter mechanism, includes a circular filter plate, having a hole in the approximate center thereof, wherein a first portion of the filter plate has a continuously-variable band pass (CVBP) dichroic filter coating and a second portion thereof has a continuously-variable band reject (CVBR) dichroic filter, each of the filter coatings having continuously-variable hue characteristic along a first gradient axis of the circular plate and having continuously-variable saturation characteristic along a second gradient axis of the plate. In this circular aspect, the first (hue) gradient axis extends annuarly around the plate while the second (saturation) gradient axis extends radially from a central portion to a peripheral portion of the plate. The circular filter plate is mounted in a carriage movable in at least one axis of a plane, the filter plate also being rotatable about an axis of rotation. The plane of movement is preferably normal to the axis of a light beam passing through the plane of the filter plate and the axis of rotation is approximately parallel to the axis of the light beam. The circular filter plate may be a single piece or, for convenience of manufacture, may be formed of two pieces mounted abutting. According to another aspect of the invention, a light projection system comprising a lamp with a reflector and a lens includes a color filter mechanism having co-planar, variable band-pass and band-reject filters supported by a motorized carriage mounted in a region where the beam diameter is small.

In accordance with another aspect of the invention, an illumination optical system includes a lamp coupled with a reflector projecting a light beam along an optical axis, and a color filter apparatus having a planar selected-wavelength modifier that is adjustable in the plane of the modifier. The optical system may be configured as a projection optical system, having either a condenser lens arrangement or an elliptical reflector arrangement, or may be configured as a wash light system having a particular beam divergence control such as a Fresnel or lenticular lens.

DETAILED DESCRIPTION

Figure 1:
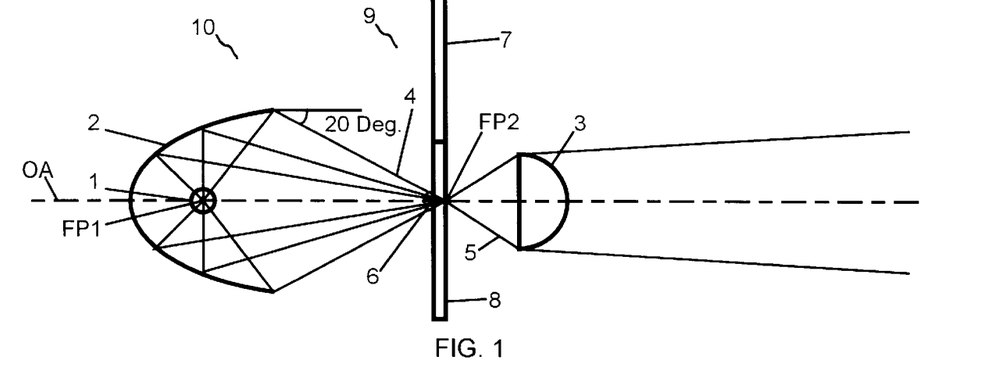
FIG. 1 is a schematic side elevation of an optical system for a spot luminaire.

As shown in FIG. 1, an optical system 10 for a spot luminaire includes a light source 1 located at a first focal point FP1 of an elliptical reflector 2, a cross-fading color filter assembly 9 including a color filter plate in accordance with the present invention, and a projection lens 3. When energized, light source 1, in cooperation with reflector 2, projects a beam of light along optical axis OA passing through focal points FP1 and FP2. The profile of the elliptical reflector is chosen to produce an illumination cone 4 having a shallow angle and illuminate a small spot on a color filter plate of the color filter mechanism. The half-angle of illumination cone 4 measured between optical axis OA and a boundary of the cone, is preferably about 20 degrees as shown in FIG. 1 (the half-angle, for convenience, being shown between a boundary of the cone and another line drawn parallel to axis OA), although a practical system may use an illumination cone having a half-angle of up to approximately 30 degrees. The projection lens is located to intercept diverging light rays having passed through a second focal point FP2 of the reflector, and is designed to project light rays that approach the lens within cone angle 5 which generally matches the acceptance angle of the lens. Alternatively, lens 3 can be replaced with a Fresnel lens to produce an optical system for a wash luminaire. The color filter mechanism is located near the second focal point of the reflector, at a place where the beam diameter is small and produces a small spot of light 6 incident on a color filter plate.

Figure 2:
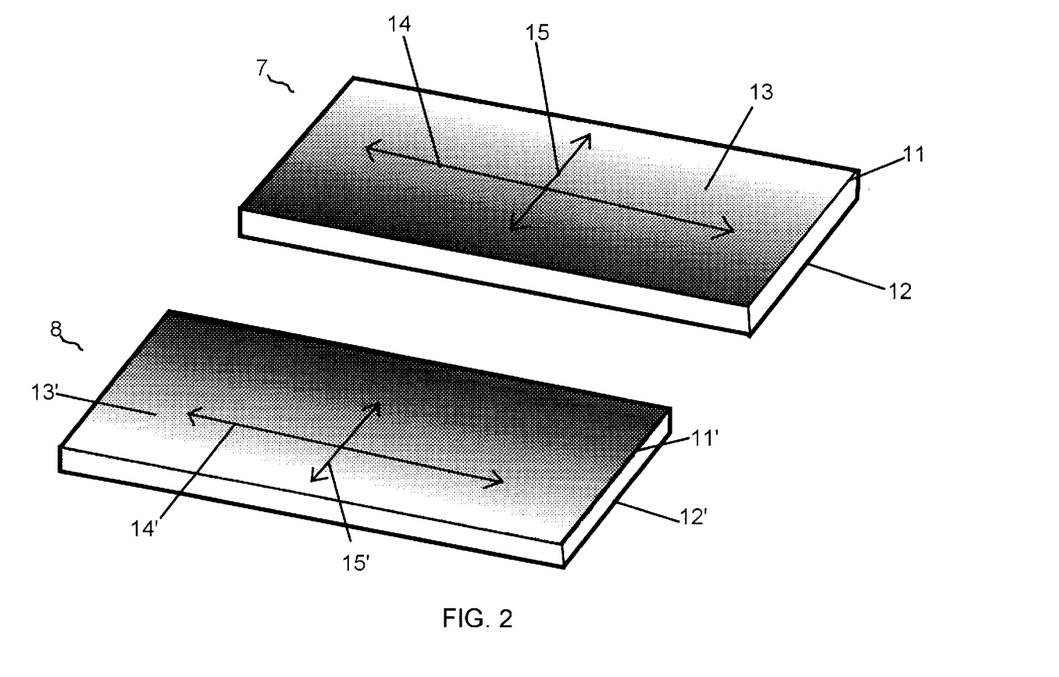
FIG. 2 is a plan view of a color filter plate according to the present invention.

As shown in FIG. 2, a color filter plate 7 according to one aspect of the present invention, comprises a spatially-modulated, multi-layer, thin-film, dielectric coating 11 deposited on a transparent substrate 12 to form an interference or dichroic filter. The substrate is generally rectangular and is composed of a high-temperature glass or other transparent material resistant to heat. The various layers of dielectric materials have different indices of refraction and thickness, the thickness being varied over the filter surface to produce continuously variable or substantially continuously variable spectral responses. Preferably the thickness of each layer of dielectric material is continuously or substantially continuously varied across the surface of the substrate, being generally thinner at one end of the plate and being generally thicker at an opposite end of the substrate. The dichroic filter coating is spatially-modulated with a variable-density half-tone or dot-density pattern 13 formed in the coating, the density being varied over the filter surface to produce continuously variable or substantially continuously variable color saturation. Preferably the density of the pattern is continuously or substantially continuously varied across the surface of the substrate, being generally denser at one end of the substrate and being generally less dense at an opposite end of the substrate. The parameters of the coating material, which affect the perceived hue of a colored light beam passing through the filter, are varied along a first gradient axis 14 of the color filter plate while the density of the pattern formed in the coating, which affects the color saturation of the light beam, is varied along a second gradient axis 15 of the color filter plate. In a preferred embodiment, the first and second gradient axes are orthogonal to the rectangular profile of the transparent substrate upon which the color filter coating is deposited.

A second color filter plate 8, according to another aspect of the invention, comprises another spatially-modulated, multi-layer, thin-film, dielectric coating 11' deposited on another transparent substrate 12' to form another interference or dichroic filter. Whereas coating 11 forms a variable band-pass dichroic filter, coating 11' is formulated to provide a variable band-reject dichroic filter. Coating 11' is also spatially-modulated with a variable-density half-tone or dot-density pattern 13' formed in the coating, the density being varied over the filter surface to produce continuously variable or substantially continuously variable color saturation. The parameters of the coating material, which affect the perceived hue of a colored light beam passing through the filter, are varied along a first gradient axis 14' of the color filter plate while the density of the pattern formed in the coating, which affects the color saturation of the light beam, is varied along a second gradient axis 15' of the color filter plate. In a preferred embodiment, the first and second gradient axes are again orthogonal to the rectangular profile of the transparent substrate upon which the color filter coating is deposited.

As shown in FIGS. 3A–3H, the spectral response of the color filter plate varies depending upon the area of the plate through which the light beam passes. The color filter plate of the present invention can be constructed as a continuously-variable or substantially continuously variable band pass (CVBP) filter 7 or as a continuously-variable or substantially continuously variable band reject (CVBR) filter 8. A band width can be specified as a percentage of a center wavelength. As a band pass filter, the color filter plate transmits wavelengths within the pass band width and reflects all other visible wavelengths. As a band reject filter, the color plate reflects wavelengths within the reject band width and transmits all other visible wavelengths.

Figure 3A:
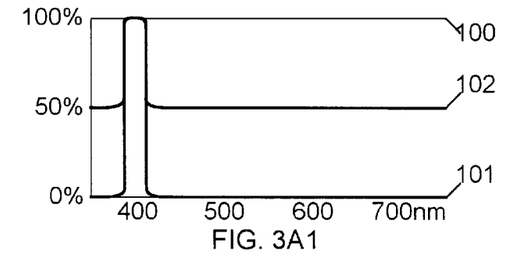
FIG. 3 comprises a set of spectral response curves illustrating certain properties of the color filter plates of the present invention.
Figure 3A:
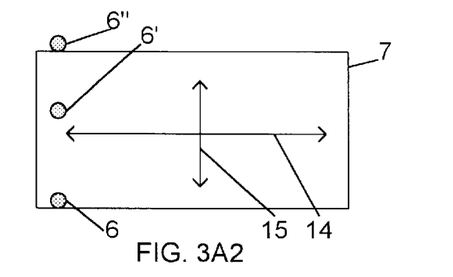
Figure 3B:
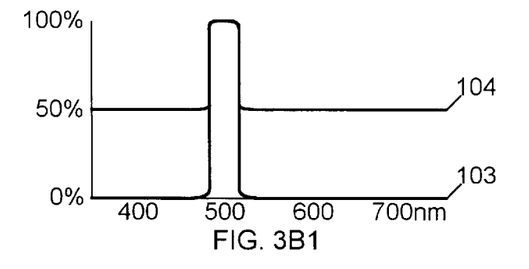
Figure 3B:
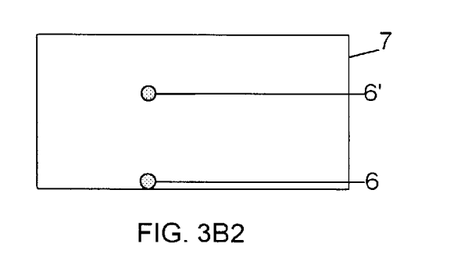
Figure 3C:
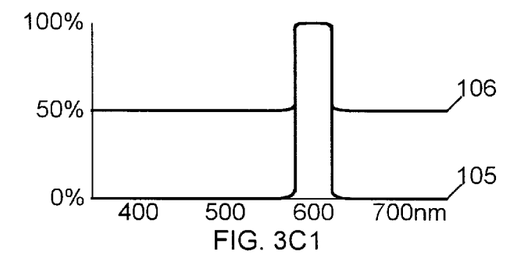
Figure 3C:
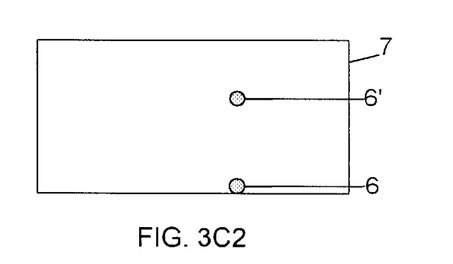
Figure 3D:
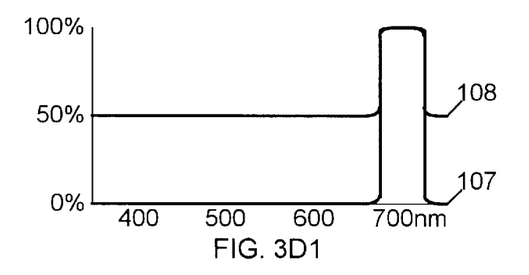
Figure 3D:
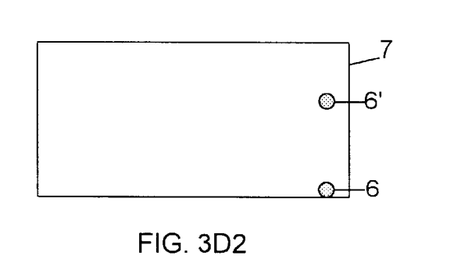
Figure 3E:
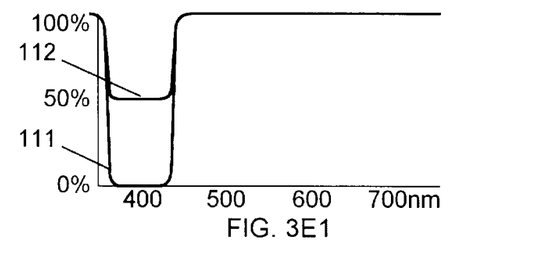
Figure 3E:
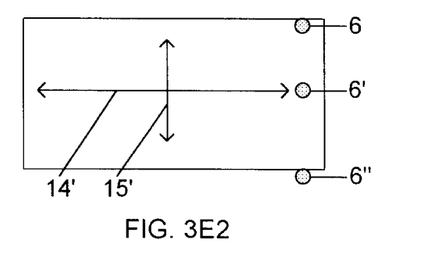
Figure 3F:
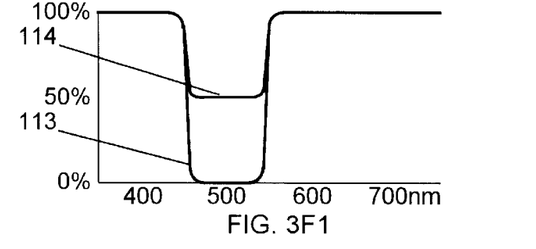
Figure 3F:
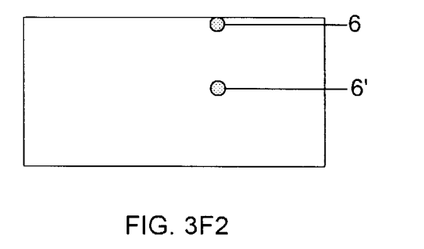
Figure 3G:
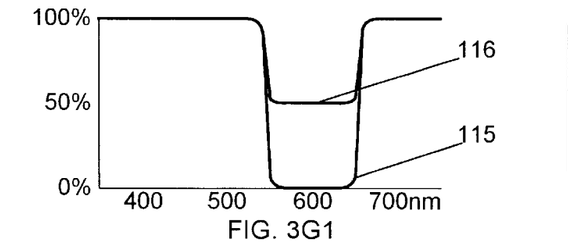
Figure 3G:
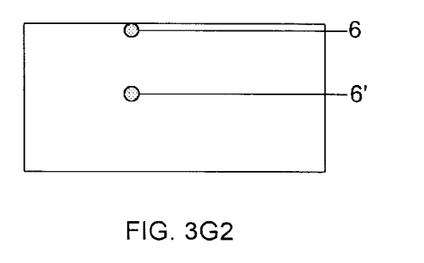
Figure 3H:
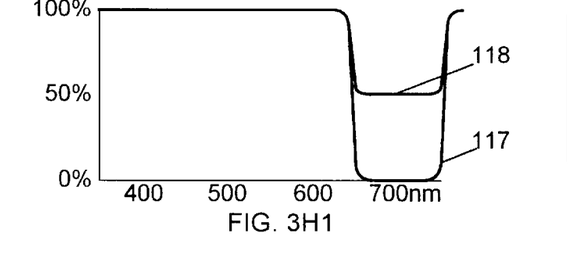
Figure 3H:
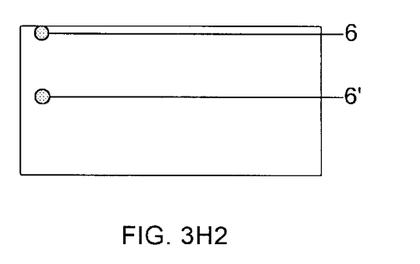

In particular, and in accordance with a preferred embodiment of the present invention, FIG. 3A shows two spectral response curves of band-pass filter plate 7 with a spot of light 6 incident on the filter plate at a first location along the hue axis, and with a spot of light 6' incident on the filter plate at a corresponding location displaced along the saturation axis. With the spot 6 at a location in a densely-coated, fully-saturated region of the filter plate 7, the color of light transmitted therethrough is represented by spectral response curve 101, which shows a narrow band of transmitted wavelengths approximately centered around 400 nm. The band width, for purposes of illustration, is approximately 10% of the center wavelength, or 40 nm band width at 400 nm center wavelength. Transmittance within the band is at about 100% while transmittance outside the band in nearly 0%. With the spot 6' at a location in a less densely-coated, less-saturated region of the filter plate 7, the color of light transmitted therethrough is represented by spectral response curve 102, which shows a narrow band of approximately 100% transmittance approximately centered around 400 nm, but with approximately 50% transmittance of other wavelengths outside the band. This second position of the spot of light 6', is achieved by moving the filter plate in one direction, along the saturation axis 15, while holding the position of the plate constant with respect to the hue axis 14. Note that the filter plate can be moved out of the beam path so that a spot of light 6" is not incident upon the filter plate, thereby providing un-filtered, white light, which is represented by curve 100 showing 100% transmittance throughout the range of visible light.

FIG. 3B shows spectral response curves of filter plate 7 with the spot 6 incident at a second point along the hue axis and with spot 6' at a corresponding point displaced along the saturation axis. With the spot 6 at a location in a densely-coated, fully-saturated region of the filter plate 7, the color of light transmitted therethrough is represented by spectral response curve 103, which shows a narrow band of approximately 100% transmittance approximately centered around 500 nm, transmittance outside the band being nearly 0%. With the spot 6' at a location in a less densely-coated, less-saturated region of the filter plate 7, the color of light transmitted therethrough is represented by spectral response curve 104, which shows a narrow band of approximately 100% transmittance approximately centered around 500 nm, but with approximately 50% transmittance of other wavelengths outside the band. Note that as the filter plate 7 is translated across the beam path along the hue axis, the spot of light 6 moves from the location shown in FIG. 3A to the location shown in FIG. 3B, and the spectral response varies continuously from that of response curve 101 to that of response curve 103. Again, the filter plate can be translated along the saturation axis to locate the spot of light in less densely saturated regions, such as represented by spot 6' in FIG. 3B, as desired. The filter plate can be translated along either or both the hue and/or saturation axes simultaneously as desired.

FIG. 3C shows the spot of light 6 at a third location along the hue axis and spot 6' at a corresponding location displaced along the saturation axis. The color of light transmitted through the filter plate at spot 6 is represented by spectral response curve 105, which shows a narrow band of approximately 100% transmittance approximately centered around 600 nm, transmittance outside the band being nearly 0%. The color of light transmitted through the filter plate a spot 6' is represented by spectral response curve 106, which shows a narrow band of approximately 100% transmittance approximately centered around 600 nm, but with approximately 50% transmittance of other wavelengths outside the band.

FIG. 3D shows the spot of light 6 at a fourth location along the hue axis and spot 6' at a corresponding location displaced along the saturation axis. The color of light transmitted through the filter plate at spot 6 is represented by spectral response curve 107, which shows a narrow band of approximately 100% transmittance approximately centered around 700 nm, transmittance outside the band being nearly 0%. The color of light transmitted through the filter plate a spot 6' is represented by spectral response curve 108, which shows a narrow band of approximately 100% transmittance approximately centered around 700 nm, but with approximately 50% transmittance of other wavelengths outside the band.

FIG. 3E shows two spectral response curves of band-reject filter plate 8 with a spot of light 6 incident on the filter plate at a first location along the hue axis, and with a spot of light 6' incident on the filter plate at a corresponding location displaced along the saturation axis. With the spot 6 at a location in a densely-coated, fully-saturated region of the filter plate 8, the color of light transmitted therethrough is represented by spectral response curve 111, which shows a narrow band of rejected wavelengths approximately centered around 400 nm. The band width, for purposes of illustration, is approximately 20% of the center wavelength, or 80 nm band width at 400 nm center wavelength. Transmittance within the band is at about 0% while transmittance outside the band in nearly 100%. With the spot 6' at a location in a less densely-coated, less-saturated region of the filter plate 8, the color of light transmitted therethrough is represented by spectral response curve 112, which shows a narrow band of approximately 50% transmittance approximately centered around 400 nm, but with approximately 100% transmittance of other wavelengths outside the band. This second position of the spot of light 6', is achieved by moving the filter plate in one direction, along the saturation axis 15, while holding the position of the plate constant with respect to the hue axis 14. Note that the filter plate can be moved out of the beam path so that a spot of light 6" is not incident upon the filter plate, thereby providing unfiltered, white light.

FIG. 3F shows spectral response curves of filter plate 8 with the spot 6 incident at a second point along the hue axis and with spot 6' at a corresponding point displaced along the saturation axis. With the spot 6 at a location in a densely-coated, fully-saturated region of the filter plate 8, the color of light transmitted therethrough is represented by spectral response curve 113, which shows a narrow band of approximately 0% transmittance approximately centered around 500 nm, transmittance outside the band being nearly 100%. With the spot 6' at a location in a less densely-coated, less-saturated region of the filter plate 8, the color of light transmitted therethrough is represented by spectral response curve 114, which shows a narrow band of approximately 50% transmittance approximately centered around 500 nm, but with approximately 100% transmittance of other wavelengths outside the band. Note that as the filter plate 8 is translated across the beam path along the hue axis, the spot of light 6 moves from the location shown in FIG. 3E to the location shown in FIG. 3F, and the spectral response varies continuously from that of response curve 111 to that of response curve 113. Again, the filter plate can be translated along the saturation axis to locate the spot of light in less densely saturated regions, such as represented by spot 6' in FIG. 3F, as desired. The filter plate can be translated along either or both the hue and/or saturation axes simultaneously as desired.

FIG. 3G shows the spot of light 6 at a third location along the hue axis and spot 6' at a corresponding location displaced along the saturation axis. The color of light transmitted through the filter plate at spot 6 is represented by spectral response curve 115, which shows a narrow band of approximately 0% transmittance approximately centered around 600 nm, transmittance outside the band being nearly 100%. The color of light transmitted through the filter plate a spot 6' is represented by spectral response curve 116, which shows a narrow band of approximately 50% transmittance approximately centered around 600 nm, but with approximately 100% transmittance of other wavelengths outside the band.

FIG. 3H shows the spot of light 6 at a fourth location along the hue axis and spot 6' at a corresponding location displaced along the saturation axis. The color of light transmitted through the filter plate at spot 6 is represented by spectral response curve 117, which shows a narrow band of approximately 0% transmittance approximately centered around 700 nm, transmittance outside the band being nearly 100%. The color of light transmitted through the filter plate a spot 6' is represented by spectral response curve 118, which shows a narrow band of approximately 50% transmittance approximately centered around 700 nm, but with approximately 100% transmittance of other wavelengths outside the band.

Filters of this type are distinguished from short-wave pass or long-wave pass edge filters, such as those disclosed in U.S. Pat. No. 4,602,321 or U.S. Pat. No. 4,800,474; or those disclosed in U.S. Pat. No. 5,282,121 or U.S. Pat. No. 5,426,576; in that the filters of the present invention exhibit a cut-on wavelength characteristic and a cut-off wavelength characteristic within the visible band of the electromagnetic spectrum throughout most of the various positions of the filter, and generally do not exhibit another cut-on or cut-off wavelength characteristic within the visible band. Thus, a controlled band-width filter of the band-pass or band-reject type is formed, the filter having no secondary complex characteristic such as described in U.S. Pat. No. 5,426,576. Nevertheless, the band-reject filter may exhibit edge filter behavior at either end of the visible range if a boundary of the reject band passes into the non-visible range.

The pattern can be formed in the filter coating by masking the substrate during application of the filter coating to the substrate. Alternatively, a pattern can be formed in the filter coating by a laser ablation process, such as described in co-pending U.S. patent application Ser. No. 08/473,149. Further, alternatively, a chemical photoetching process can be used to form the pattern.

In a typical application, the goal may be to illuminate a small spot on the color filter plate with a light beam having a narrow illumination cone and obtain a five nanometer shift in center wavelength along the hue gradient axis passing through the spot. A typical optical system may have a beam divergence angle of 10 degrees and project a spot of light 3½ feet (106 cm) in diameter at a distance of 20 feet (6.07 m). The same optical system may have a field divergence angle of 20 degrees and project a pool of light 7.8 feet (2.4 m) in diameter at 20 feet (6.07 m). It is desirable that the perceived hue of the light be the same across the diameter of the spot or pool. A narrow illumination cone is therefore desired to minimize hue gradient across the spot due to variations in angle of incidence of the light rays upon the filter. As is well-known in the art, small angles of incidence below approximately 30 degrees introduce only disproportionately small shifts in center wavelength, but angles of incidence of 45 degrees or greater produce noticeable hue variations. A small spot size is also desired to minimize hue gradient across the spot due to the variable dielectric thin-film coating.

Figure 4:
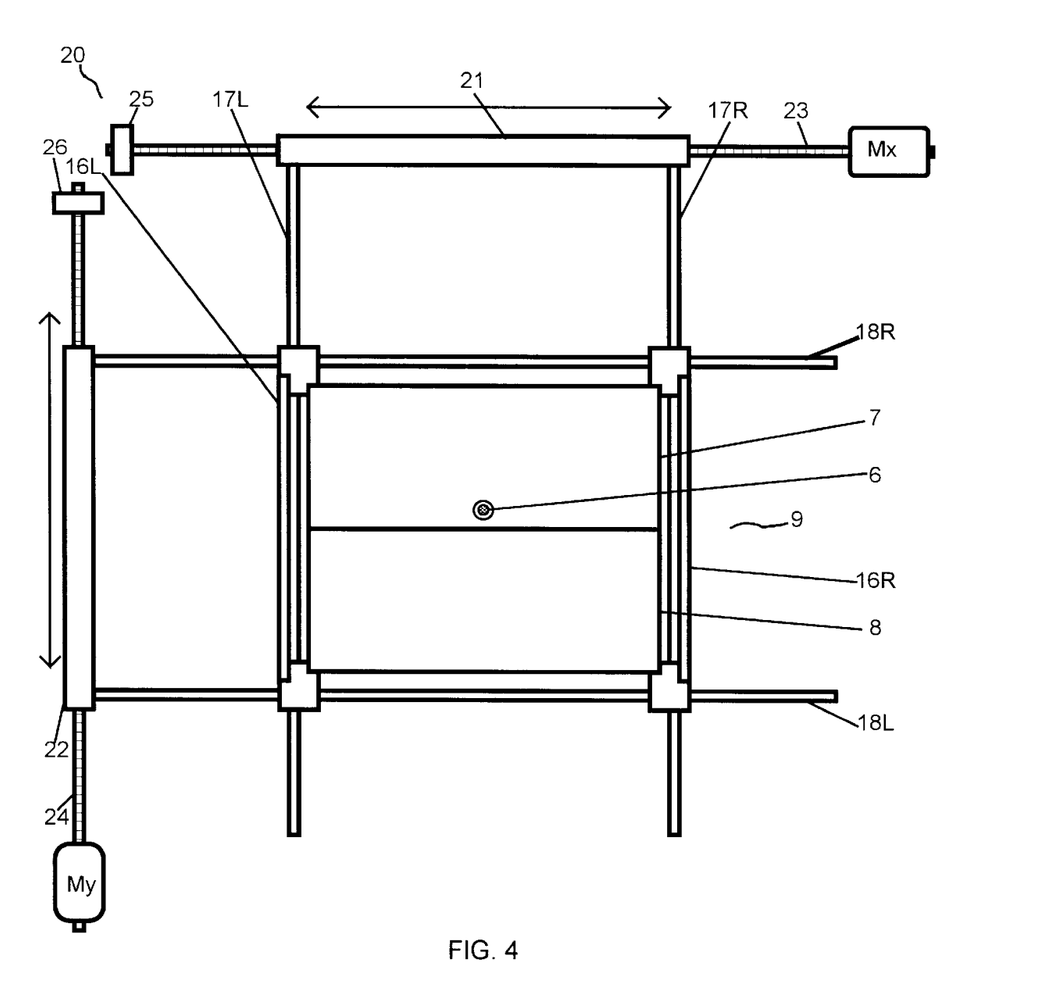
FIG. 4 is schematic front elevation of a color filter mechanism according to the present invention.

One possible mechanism 20 for translating a color filter plate in two orthogonal axes is shown in FIG. 4. In a preferred embodiment, a filter plate assembly 9, comprising band-pass filter 7 and band-reject filter 8 mounted abutting edge-to-edge in a plane such that areas of maximum saturation on filter 7 and on filter 8 abut, is supported by brackets 16L and 16R. Alternatively, filter plate assembly 9 may comprise a single transparent substrate having a band-pass filter coating applied to one portion thereof, and having a band-reject filter coating applied to a second portion thereof, each of the portions having been masked during application of a filter coating to the other portion. The brackets are supported by two pair of parallel rails or slides 17L, 17R and 18L, 18R. Each pair of parallel slides is coupled by an assembly 21, 22 housing ball nuts (not shown) at either end thereof. Each ball nut housing 21, 22 rides on a lead screw 23, 24 which is rotatable by a motor Mx or My and supported by bearings 25, 26. The mechanism is positioned in the optical system so as to intercept a light beam forming an illuminated spot 6 on one or the other color filter plate, depending upon the position of the carriage. In operation, motor Mx can be energized in a forward or reverse direction to translate the color filter carriage along an X axis and motor My can be similarly energized to translate the carriage along a Y axis. The two motors can be energized singly or simultaneously as desired to control the position of the illuminated spot on the color filter assembly. A rack-and-pinion drive arrangement can be used instead of lead screw arrangement. Dual-axis translation mechanisms are well known and are shown, for example, in U.S. Pat. No. 5,311,791 to Yanagisawa.

In operation, motor Mx is energized to control the hue characteristic of a light beam transmitted through the filter assembly while motor My is energized to control the saturation characteristic of the light beam. In a preferred embodiment, areas of maximum saturation on filter 7 and on filter 8 abut, and motor My drives the filter assembly to position areas of greater or lesser filter density in the beam path, further driving the filter assembly completely out of the beam path to obtain un-filtered white light.

Figure 5:
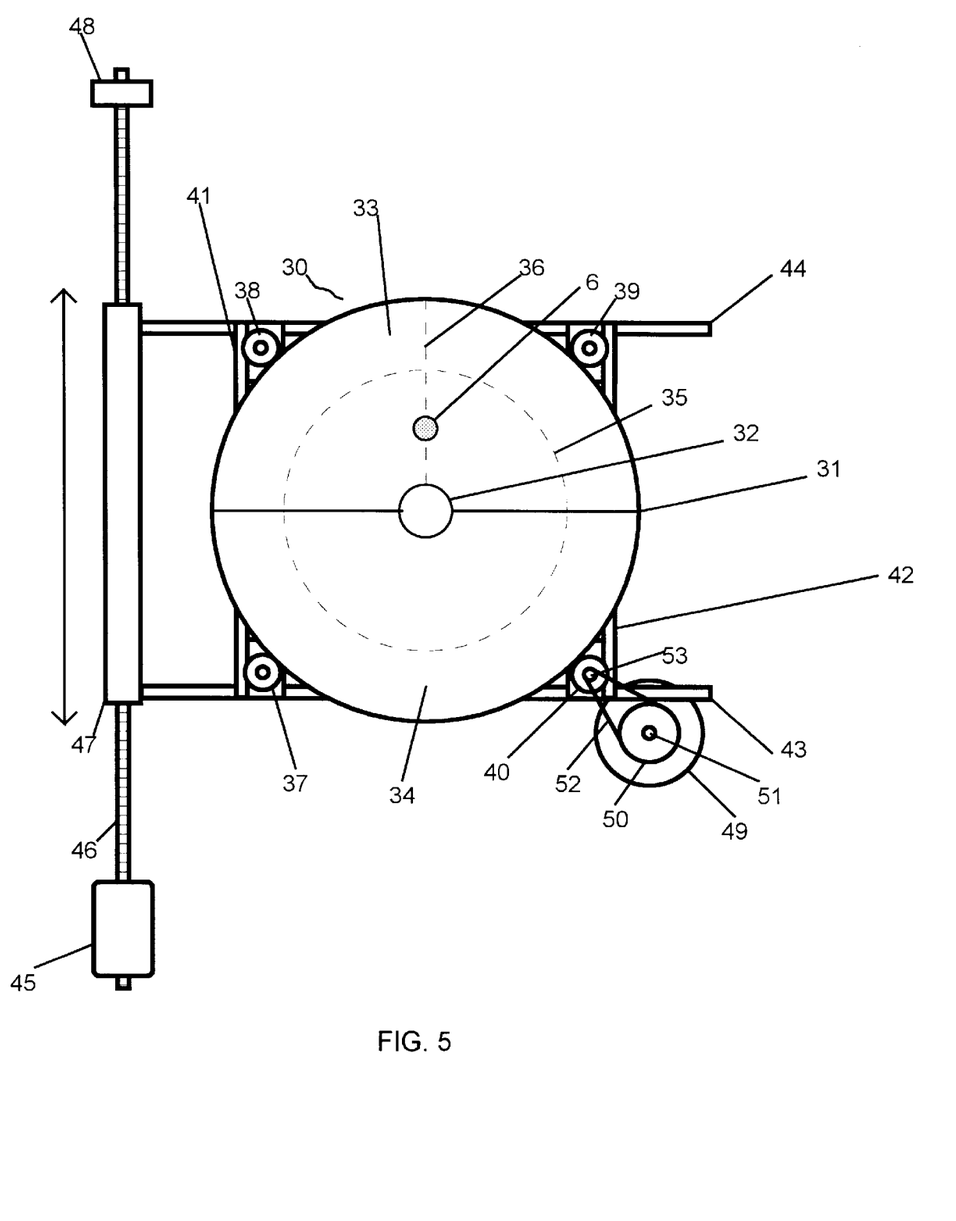
FIG. 5 is a plan view of another color filter plate according to the present invention.

As shown in FIG. 5, a color filter plate 30 according to another aspect of the present invention, comprises a generally circular transparent substrate 31 having a hole 32 formed in the center thereof, with spatially-modulated, multi-layer, thin-film, dielectric coatings deposited on the substrate to form interference or dichroic filters. A first portion 33 of the filter plate has a continuously-varied or substantially continuously varied band pass (CVBP) dichroic filter coating and a second portion 34 thereof has a continuously-varied or substantially continuously varied band reject (CVBR) dichroic filter, each of the filter coatings having a continuously-variable or substantially continuously variable hue characteristic along a first gradient axis 35 of the plate and having continuously-variable or substantially continuously variable saturation characteristic along a second gradient axis 36 of the plate. In this circular aspect, the first (hue) gradient axis 35 extends annularly around the plate while the second (saturation) gradient axis 36 extends radially from a central portion to a peripheral portion of the plate. In a preferred embodiment, areas of maximum filter density are arranged peripherally about the circumference of the circular filter plate, and the filter density decreases radially towards more central regions of the filter plate. Alternatively, the areas of maximum filter density could be arranged annularly about a central region of the plate, with the filter density decreasing radially towards peripheral regions of the plate. The circular filter plate can be mounted in a carriage movable in at least one axis of a plane, the filter plate also being rotatable about an axis of rotation. The plane of movement is preferably normal to the axis of a light beam passing through the plane of the filter plate and the axis of rotation is approximately parallel to the axis of the light beam. The circular filter plate may be a single piece or, for convenience of manufacture, may be formed of two pieces mounted abutting.

One possible mechanism for translating and rotating the circular filter plate 30, as shown in FIG. 5, is adapted from the two-axis orthogonal translation mechanism shown in FIG. 4, and comprises a set of roller bearings 37–40 supporting the filter plate, a pair of brackets 41, 42 supporting the roller bearings, a pair of rails 43, 44 supporting the brackets, a first drive arrangement including a reversible electric motor 45 coupled to a lead screw 46 passing through a ball nut housing 47, which is coupled to the rails 43, 44, the lead screw being supported at a distal end by bearing 48; the mechanism further comprising a second drive arrangement including a reversible electric motor 491 having a drive pulley 50 mounted to the motor shaft 51, and a drive belt 52 coupling the drive pulley to a driven pulley 53 integral with or coupled to one of the roller bearings 40.

In operation, circular filter plate 30 is rotated to position an area of the filter coating having a desired hue characteristic in the beam path, and is translated laterally to position an area having a desired filter density in the beam path. The filter may be translated to position the central hole 32 in the beam path to obtain unfiltered white light. The motors 45 and 49 can be energized individually or simultaneously, in either a forward or reverse direction as desired to translate and/or rotate the circular filter plate 30 so as to position the spot of light 6 at any desired location on the filter plate or to position the spot in the central hole 32.

A circular filter plate according to the present invention described above minimizes space requirements within a luminaire housing since one of the axes of lateral translation is eliminated, being replaced instead by rotation of the filter plate as the hue gradient axis now describes an arc about the axis of rotation. The circular filter plate is translated along the remaining axis of lateral translation as the saturation gradient axis of the filter lies radially along the filter surface where the beam intersects the filter. The swept volume of the color filter mechanism is thereby minimized.

Although several embodiments of the invention have been illustrated and/or discussed, it will be understood that the invention is not limited to the specific embodiments disclosed, but is capable of numerous rearrangements and modifications without departing from the spirit of the invention.

We claim:

1. A color filter plate comprising: a transparent substrate supporting a spatially-modulated, interference filter coating, said coating exhibiting a hue characteristic that varies along a first gradient axis thereof, said coating exhibiting a saturation characteristic that varies along a second gradient axis thereof.

2. A color filter plate according to claim 1 wherein said hue characteristic varies substantially continuously along said first gradient axis.

3. A color filter plate according to claim 1 wherein said saturation characteristic varies substantially continuously along said second gradient axis.

4. A color filter plate according to claim 1, wherein said coating comprises a thin-film dielectric interference filter having a plurality of layers, said layers thereof having a continuously-varied thickness along said first gradient axis.

5. A color filter plate according to claim 1, wherein said coating has a pattern formed therein, said pattern having a continuously-varied density along said second gradient axis.

6. A color plate according to claim 5, wherein said pattern comprises a stochastic pattern of randomly sized and/or arranged dots.

7. A color filter plate according to claim 1, wherein said coating defines a variable band-pass filter.

8. A color filter plate according to claim 1, wherein said coating defines a variable band-reject filter.

9. A color filter plate according to claim 1, wherein said first and second gradient axes are generally orthogonal to each other.

10. A color filter assembly comprising:
    a first color filter plate comprising a transparent substrate supporting a spatially-modulated, interference filter coating, said coating exhibiting a band-pass hue characteristic that varies along a first gradient axis thereof, said coating exhibiting a saturation characteristic that varies along a second gradient axis thereof; and
    a second color filter plate comprising a transparent substrate supporting a spatially-modulated, interference filter coating, said coating exhibiting a band-reject hue characteristic that varies along a first gradient axis thereof, said coating exhibiting a saturation characteristic that varies along a second gradient axis thereof;
    said first and second color filter plates being arranged in a single plane.

11. A color filter assembly according to claim 10 wherein said band-pass hue characteristic of said first color filter plate varies substantially continuously along said first gradient axis and wherein said saturation characteristic of said first color filter plate varies substantially continuously along said second gradient axis.

12. A color filter assembly according to claim 11 wherein the band-reject hue characteristic varies substantially continuously along said first gradient axis of said second color filter plate and wherein said saturation characteristic of said second color filter plate varies substantially continuously along the second gradient axis of said second color filter plate.

13. A color filter assembly according to claim 10, wherein said coating comprises a thin-film dielectric interference filter having a plurality of layers, said layers having a continuously-varied thickness along said first gradient axis.

14. A color filter assembly according to claim 10, wherein said coating has a pattern formed therein, said pattern having a continuously-varied density along said second gradient axis.

15. A color filter assembly according to claim 14, wherein said pattern comprises a stochastic pattern of randomly sized and/or arranged dots.

16. A color filter assembly according to claim 10, wherein said first and second color filter plates are generally rectangular.

17. A color filter assembly according to claim 16, wherein each of said first and second color filter plates has a region of maximum saturation, said respective regions of maximum saturation being disposed in abutting relationship to one another.

18. A color filter assembly according to claim 10, wherein said first and second color filter plates are generally semi-circular.

19. A color filter assembly according to claim 18, wherein said filter assembly is generally circular.

20. A color filter assembly according to claim 19, wherein a region of maximum saturation is a peripheral region of said filter assembly.

21. A color filter mechanism comprising:
    at least one color filter plate comprising a transparent substrate supporting a spatially-modulated, interference filter coating on a surface thereof, said coating exhibiting a hue characteristic that varies along a first gradient axis thereof, said coating exhibiting a saturation characteristic that varies along a second gradient axis thereof; and
    a carriage supporting said color filter plate, said carriage being movable in two directions relative to said surface.

22. A color filter mechanism according to claim 21, wherein said coating comprises a thin-film dielectric interference filter having a plurality of layers, said layers having a continuously-varied thickness along said first gradient axis.

23. A color filter mechanism according to claim 21, wherein said coating has a pattern formed therein, said pattern having a continuously-varied density along said second gradient axis.

24. A color filter mechanism according to claim 23, wherein said pattern comprises a stochastic pattern of randomly sized and/or arranged dots.

25. A color filter mechanism according to claim 21, wherein said color plate is generally rectangular.

26. A color filter mechanism according to claim 25, wherein both of said two directions are linear.

27. A color filter mechanism according to claim 21, further comprising a second color filter plate comprising a transparent substrate supporting a spatially-modulated, interference filter coating on a surface thereof, said coating exhibiting a hue characteristic, said hue characteristic of said second color plate being different from the hue characteristic of the first color filter plate and varying along a first gradient axis of said second color filter plate, said coating of said second color filter plate exhibiting a saturation characteristic that varies along a second gradient axis of said second color filter plate, said second color filter plate being supported by said carriage, said first and second color filter plates being disposed in a common plane.

28. A color filter mechanism according to claim 27, wherein said first and second color filter plates are generally semi-circular.

29. A light projection system according to claim 27 wherein said hue characteristic varies substantially continuously along said first gradient axis and wherein said saturation characteristic varies substantially continuously along said second gradient axis.

30. A color filter mechanism according to claim 28, wherein one of said directions is linear and the other of said directions is arcuate.

31. A light projection system comprising:
   a lamp coupled with a reflector such that when said lamp is energized, said lamp and reflector form a visible light beam focused upon a focal point;
   a color filter plate mounted adjacent to said focal point, said color filter plate comprising a transparent substrate supporting a spatially-modulated, interference filter coating on a surface thereof, said coating exhibiting a hue characteristic that varies along a first gradient axis thereof, said coating exhibiting a saturation characteristic that varies along a second gradient axis thereof;
   a carriage supporting said color filter plate, said carriage being movable in two directions relative to said surface; and
   a lens disposed downstream of said color filter plate.

32. A light projection system according to claim 31, wherein said color filter plate is generally rectangular.

33. A light projection system according to claim 32, wherein said carriage is movable in two linear directions.

34. A light projection system according to claim 31, wherein said color filter plate is generally semi-circular.

35. A light projection system according to claim 34, wherein said carriage is movable in a linear direction and an arcuate direction.

36. A light projection system according to claim 31, further comprising a second color filter plate having a transparent substrate supporting a spatially-modulated, interference filter coating on a surface thereof, said coating exhibiting a hue characteristic, said hue characteristic of said second color filter plate being different from the hue characteristic of the first color filter plate and varying along a first gradient axis of said second color filter plate, said coating on said second color filter plate exhibiting a saturation characteristic that varies along a second gradient axis of said second color filter plate, said second color filter plate being supported by said carriage, said first and second color filter plates being disposed in a common plane.

37. A light projection system according to claim 31, further comprising a motor drive coupled to said carriage.

38. A light projection system comprising:
   a lamp coupled with a reflector such that when said lamp is energized, said lamp and reflector form a visible light beam focused upon a focal point;
   a first color filter plate mounted adjacent to said focal point, said color filter plate comprising a transparent substrate supporting a spatially-modulated, continuously-variable interference filter coating on a surface thereof, said coating exhibiting a continuously variable band-pass hue characteristic along a first gradient axis thereof, said coating exhibiting a continuously-variable saturation characteristic along a second gradient axis thereof;
   a second color filter plate comprising a transparent substrate supporting a spatially-modulated, continuously-variable interference filter coating on a surface thereof, said coating exhibiting a continuously-variable band-reject hue characteristic along a first gradient axis thereof, said coating exhibiting a continuously-variable saturation characteristic along a second gradient axis thereof
   a carriage supporting said color filter plates, said carriage being movable in two directions relative to said surface;
   a motor drive coupled to said carriage; and
   a lens disposed downstream of said filter plates.

39. A light projection system according to claim 38, wherein said coating comprises a thin-film dielectric interference filter having a plurality, of layers said layers having a continuously-varied thickness along said first gradient axis.

40. A light projection system according to claim 38, wherein said coating has a pattern formed therein, said pattern having a continuously-varied density along said second gradient axis.

41. A light projection system according to claim 40, wherein said pattern comprises a stochastic pattern of randomly sized and arranged dots.

42. A light projection system according to claim 38, wherein said color filter plates are generally rectangular.

43. A light projection system according to claim 42, wherein said carriage is movable in two linear directions.

44. A light projection system according to claim 38, wherein said color filter plates are generally semi-circular.

45. A light projection system according to claim 44, wherein said carriage is movable in a linear direction and an arcuate direction.

46. A color filter assembly comprising;
   a transparent substrate;
   a first spatially-modulated, interference filter coating supported by said substrate, said coating exhibiting a band-pass hue characteristic that varies along a first gradient axis thereof, said coating exhibiting a saturation characteristic that varies along a second gradient axis thereof; and
   a second spatially-modulated, interference filter coating supported by said substrate, said coating exhibiting a band-reject hue characteristic that varies along a first gradient axis thereof, said coating exhibiting a saturation characteristic that varies along a second gradient axis thereof;
   said first and second filter coatings being arranged adjacent to each other on said substrate.

47. A color filter assembly according to claim 46, wherein each said coating comprises a thin-film dielectric interference filter having a plurality of layers, said layers having a continuously-varied thickness along respective said first gradient axes.

48. A color filter assembly according to claim 46, wherein each said coating has a pattern formed therein, said pattern having a continuously-varied density along respective said second gradient axes.

49. A color filter assembly according to claim 48 wherein each said pattern comprises a stochastic pattern of randomly sized and/or arranged dots.

50. A color filter assembly according to claim 46, wherein said color filter assembly is generally rectangular.

51. A color filter assembly according to claim 50, wherein regions of maximum saturation of said first and second filter coatings are adjacent to one another.

52. A color filter assembly according to claim 46 wherein said filter assembly is generally circular.

53. A color filter assembly according to claim 52, wherein regions of maximum saturation of said first and second filter coatings are peripheral regions of said filter assembly.

54. A color filter mechanism comprising;

a transparent substrate;

a first spatially-modulated, interference filter coating supported by said substrate, said coating exhibiting a band-pass hue characteristic that varies along a first gradient axis thereof, said coating exhibiting a saturation characteristic that varies along a second gradient axis thereof; and a second spatially-modulated, interference filter coating supported by said substrate, said coating exhibiting a band-reject hue characteristic that varies along a first gradient axis thereof, said coating exhibiting a saturation characteristic that varies along a second gradient axis thereof;

said first and second filter coatings being arranged adjacent to each other on said substrate; and a carriage supporting said color filter plate, said carriage being movable in two directions relative to said surface.

55. A color filter mechanism according to claim 54, wherein said coatings comprise thin-film dielectric interference filters having a plurality of layers, said layers having a continuously-varied thickness along respective said first gradient axes.

56. A color filter mechanism according to claim 54, wherein said coatings have patterns formed therein, said patterns having a continuously-varied density along said respective second gradient axes.

57. A color filter mechanism according to claim 56 wherein said patterns comprise stochastic patterns of randomly sized and/or arranged dots.

58. A color filter mechanism according to claim 54 wherein said substrate is generally rectangular.

59. A color filter mechanism according to claim 58, wherein both of said two directions are linear.

60. A color filter mechanism according to claim 54, wherein said substrate is generally circular.

61. A color filter mechanism according to claim 60, wherein one of said directions is linear and the other of said directions is arcuate.

62. A light projection system comprising:

a lamp coupled with a reflector such that when said lamp is energized, said lamp and reflector form a visible light beam focused upon a focal point;

a transparent substrate;

a first spatially-modulated, interference filter coating supported by said substrate, said coating exhibiting a band-pass hue characteristic that varies along a first gradient axis thereof, said coating exhibiting a saturation characteristic that varies along a first gradient axis thereof; and a second spatially-modulated, interference filter coating supported by said substrate, said coating exhibiting a band-reject hue characteristic that varies along a first gradient axis thereof, said coating exhibiting a saturation characteristic that varies along a second gradient axis thereof;

said first and second filter coatings being arranged adjacent to each other on said substrate;

a carriage supporting said color filter plates, said carriage being movable in two directions relative to said surface;

a motor drive coupled to said carriage; and a lens disposed downstream of said color filter assembly.

63. A light projection system according to claim 62, wherein each said coating comprises a thin-film dielectric interference filter having a plurality of layers, said layers having a continuously-varied thickness along respective said first gradient axes.

64. A light projection system according to claim 62, wherein each said coating has a pattern formed therein, said patterns having a continuously-varied density along respective said second gradient axes.

65. A light projection system according to claim 64, wherein said patterns comprise stochastic patterns of randomly sized and arranged dots.

66. A light projection system according to claim 62, wherein said substrate is generally rectangular.

67. A light projection system according to claim 66 wherein said carriage is movable in two linear directions.

68. A light projection system according to claim 62, wherein said substrate is generally circular.

69. A light projection system according to claim 68, wherein said carriage is movable in a linear direction and an arcuate direction.

* * * * *